United States Patent [19]

McClaflin

[11] Patent Number: 5,014,934
[45] Date of Patent: May 14, 1991

[54] REMOVABLE SEAL FOR DISCONTINUITIES IN AIRCRAFT SKIN

[75] Inventor: James K. McClaflin, Sumner, Wash.
[73] Assignee: The Boeing Company, Seattle, Wash.
[21] Appl. No.: 374,529
[22] Filed: Jun. 30, 1989
[51] Int. Cl.[5] .......................... B64C 1/12; B64C 1/14
[52] U.S. Cl. ..................... 244/132; 244/129.4; 403/326; 52/718.1; 52/208; 52/466
[58] Field of Search ............. 244/129.3, 129.4, 129.5, 244/132; 403/326; 52/84, 19, 208, 242, 466, 718.1; 248/231.9, 221.3

[56] References Cited

U.S. PATENT DOCUMENTS

| 1,549,721 | 8/1925 | Kraft | 244/132 X |
| 2,087,204 | 7/1937 | Johnson | 244/132 X |
| 2,114,289 | 4/1938 | Draim | 244/132 X |
| 2,118,561 | 5/1938 | Kleeberg | 244/132 X |
| 3,110,068 | 11/1963 | Perrochat | 52/718.1 X |
| 4,067,155 | 1/1978 | Ruff et al. | 52/466 X |
| 4,292,774 | 10/1981 | Mairle | 52/208 |

FOREIGN PATENT DOCUMENTS

| 613651 | 5/1935 | Fed. Rep. of Germany | 244/132 |
| 659560 | 5/1938 | Fed. Rep. of Germany | 244/132 |
| 718224 | 3/1942 | Fed. Rep. of Germany | 244/132 |
| 747145 | 1/1945 | Fed. Rep. of Germany | 244/129.3 |
| 3715328 | 8/1988 | Fed. Rep. of Germany | 244/129.4 |
| 1033878 | 6/1966 | United Kingdom | 52/84 |

OTHER PUBLICATIONS

Eaton Corporation, "Tinnerman Brand Fasteners", Catalog 3-388, EP-20M-12-87, Cleveland, OH 44141.

Primary Examiner—Joseph F. Peters, Jr.
Assistant Examiner—James M. Kannofsky
Attorney, Agent, or Firm—Joan H. Pauly

[57] ABSTRACT

A first fastener component (26) is secured to an inner aircraft skin surface (6) by a mounting flange (12) and extends across a discontinuity (8) in the skin (2). A second fastener component (28) is secured to a rib (24) on the inner surface of a resilient blade (22) and extends through the discontinuity (8) into engagement with the first component (26). Inward pressure on the blade (22) urges the components (26, 28) into releasable locked engagement with each other. The components (26, 28) secure the blade (22) in a flattened use position in which it is substantially flush with and sealingly engages the outer skin surface (4). The blade (22) may be removed by inserting a tool under it and exerting a lifting force to disengage the components (26, 28). The blade (22) may be dimensioned to cover the outer ends of adjacent fasteners (14) extending through the skin (2). The blade (22) is preferably conductive to provide a continuous electrical path along the outer skin surface (4) across the discontinuity (8).

12 Claims, 1 Drawing Sheet

REMOVABLE SEAL FOR DISCONTINUITIES IN AIRCRAFT SKIN

STATEMENT OF GOVERNMENT RIGHTS

The Government has certain rights in this invention.

TECHNICAL FIELD

This invention relates to seals for discontinuities in aircraft skins and, more particularly, to such a seal that overlaps the skin, snaps into position, is easily removable, and is reusable.

BACKGROUND ART

In aircraft, there are normally unavoidable discontinuities in the outer skin. Such discontinuities occur, for example, at the interface of adjacent panels and where access panels or doors are formed in the skin. In many situations, it is desirable to seal these discontinuities and/or provide a continuous electrical path along the outer surface of the skin across the discontinuities. Known methods for sealing a discontinuity include filling the discontinuity with putty and covering it with metallic tape. This method presents a number of problems. These problems include a time consuming installation procedure and a tendency of the seal to fail when the aircraft is in flight. In addition, this type of seal cannot be removed without destroying it, and the destructive removal procedure is time consuming. Efforts to develop an acceptable reliable seal have been complicated by the fact that normally access is available from the outside of the skin only.

DISCLOSURE OF THE INVENTION

The subject of the invention is a removable seal for covering and sealing a discontinuity extending through an outer skin portion of an aircraft. According to an aspect of the invention, the seal comprises a resilient sealing member and a fastener. The sealing member has a use position in which it covers the discontinuity and overlaps the outer surface of the outer skin portion. The fastener has a first component and a second component. The first component is secured to an inner surface of the outer skin portion and extends at least partially across the discontinuity. The second component is secured to the sealing member and is dimensioned to extend inwardly into the discontinuity and engage the first component. The first and second components have portions that automatically releasably lock the components together, when inward pressure is exerted on the sealing member to urge the first component into engagement with the second component, to secure the sealing member in its use position and urge it into sealing engagement with the outer surface of the skin portion. These portions of the components are also releasable when a lifting force is exerted on the sealing member to disengage the fastener components from each other. Preferably, the components are reusable for locking the components together.

The first component of the fastener may be secured to the skin portion by various means. It could be directly fastened to the inner surface of the skin portion by means of appropriate fasteners. However, the seal preferably has a mounting member carried by the skin portion for securing the first component to the skin inner surface.

A preferred feature of the invention is a sealing member that has a normally concave cross section which is flattened, when the fastener components are locked together, to become substantially flush with the outer surface of the skin portion. This feature has the advantage of providing a reliable tight sealing engagement between the outer edges of the sealing member and the outer surface of the skin. This in turn prevents air from getting under the sealing member when the aircraft is in flight to thereby prevent a tendency of the sealing member to peel off the skin. The tight engagement of the sealing member and the skin also helps to maintain a reliable electrical connection between the outer surface of the skin and the sealing member, when such connection is desired. In addition, a resilient sealing member with this configuration readily accommodates flexing of the skin in flight and tends to automatically compensate for minor misalignments and variations in tolerances. The substantially flush configuration of the installed sealing member helps to minimize, if not eliminate, any effect on the aerodynamic characteristics of the outer skin surface.

In the preferred embodiment of the invention, the seal comprises a plurality of fasteners spaced apart from each other. The sealing member comprises a blade having the normally concave cross section described above, and a rib. The second components of the fasteners are secured to the rib. The rib is positioned to extend along and adjacent to the discontinuity and to abut the outer surface of the skin to support the blade between the fasteners.

When the outer surface of the aircraft skin portion is electrically conductive, the sealing member preferably has electrically conductive portions to provide a continuous electrical path along the outer surface of the skin across the discontinuity. These conductive portions may be formed by the blade described above. In the preferred embodiment, the sealing member comprises a blade of spring steel to form the conductive portions.

Another feature of the invention is the dimensioning of the sealing member to cover an attaching fastener or fasteners that extend through the skin portion adjacent to the discontinuity. The attaching fasteners may be of various types and have various purposes. For example, they may attach the mounting member or a rib or other support structure to the skin. The feature of dimensioning to cover adjacent fasteners has the great advantage of reducing or eliminating a need to provide separate means for sealing and/or isolating the fasteners.

The seal of the invention solves the problems discussed above that have been encountered in connection with known methods of sealing discontinuities in aircraft skins. The seal can be easily and quickly snapped into place to install or reinstall it. The seal is also easily and quickly removable to facilitate maintenance procedures which, for example, require the opening of sealed access panels. The preferred reusability of the seal fastener further facilitates maintenance procedures and helps minimize the amount of time the aircraft is required to be on the ground for maintenance Once the first fastener component is attached to the skin, the seal can be installed, removed, and reinstalled any number of times from the outside of .the skin. The seal of the invention has a relatively simple and economical structure. The economy of the structure is enhanced by the ability to incorporate various known types of fasteners into the structure of the seal. The seal of the invention is also readily incorporated into a new design of an aircraft or retrofitted into existing aircraft. In operation, the seal of the invention is highly reliable The seal is also very versatile and can readily be adapted to the needs of different situations.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 1:
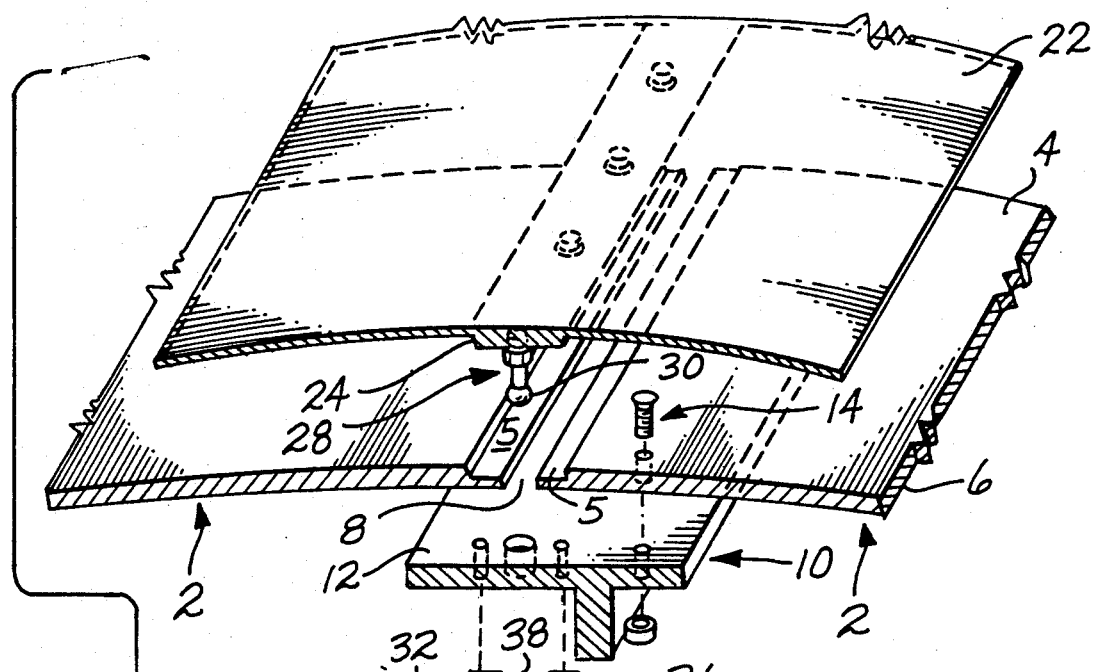
FIG. 1 is an exploded pictorial view of the preferred embodiment of the invention and an outer skin portion of an aircraft.
Figure 2:
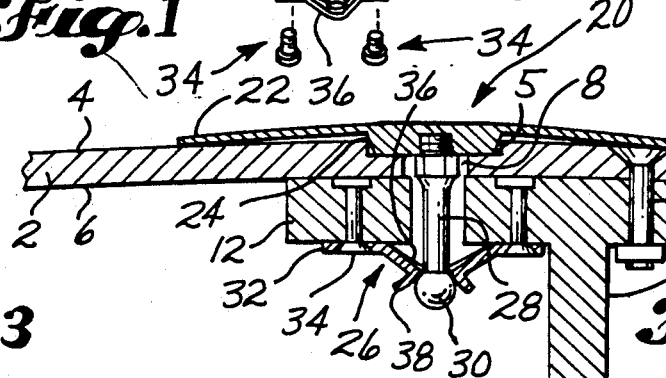
FIG. 2 is a vertical sectional view of the seal and skin portion shown in FIG. 1 in an assembled condition.

The drawings show seals 20, 20' that are constructed according to the invention and that constitute the best mode of the invention currently known to the applicant. In FIGS. 1 and 2, the seal 20 is shown covering and sealing a discontinuity 8 formed at the interface of two adjacent panels of an aircraft skin 2. The panels overlap the mounting flange 12 of a rib 10. It is anticipated that a major application of the seal of the invention will be in installations such as those shown in FIGS. 1 and 2. However, it is of course to be understood that the seal of the invention may also be used to advantage in other types of installations.

Figure 4:
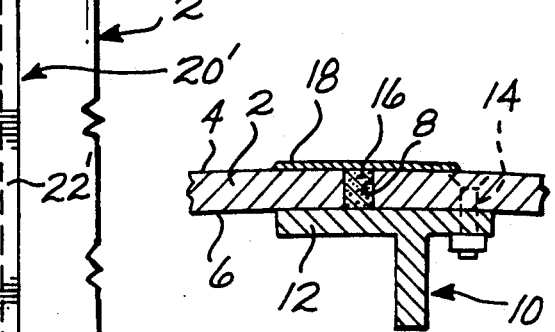
FIG. 4 is like FIG. 2 except that it shows a prior art sealing arrangement.

FIG. 4 shows for the purposes of comparison a prior art sealing arrangement. In this arrangement, putty 16 fills the discontinuity 8 between the two confronting ends of the adjacent panels of the skin 2. One of the panels is an access door which has a free edge that is supported by the mounting flange 12 of a rib 10 in a known manner. The flange 12 also serves to support the putty 16 adjacent to the inner surface 6 of the skin 2. A strip of tape 18 covers the outer end of the body of putty 16 and the adjacent outer surface 4 of the skin 2. In most situations, the tape 18 would be electrically conductive. In some cases, the tape 18 may be omitted if the conductivity requirements allow and/or the putty 16 is conductive (e.g. silver putty). A fastener 14 is provided to attach the mounting flange 12 of the rib 10 to the skin 2. The fastener 14 extends through the skin 2. It is covered, if at all, only by the tape 18.

Referring to FIGS. 1 and 2, the preferred embodiment of the seal 20 includes a sealing member 22, 24 and a fastener 26, 28. The arrangement of skin panels and support rib 10 shown in FIGS. 1 and 2 is the same as that shown in FIG. 4, except that a hole is formed in the mounting flange 12 of the rib 10 for accommodating the fastener 26, 28 of the seal 20. In the illustrated situation, the mounting flange 12 is part of the known structure of the aircraft but is adapted to also function as part of the seal 20 of the invention. In other types of situations, a mounting member similar to the flange 12 is not present in the known structure and may be added during manufacture or retrofitting of the aircraft to permit installation of the seal 20.

The sealing member 22, 24 of the seal 20 includes a resilient blade 22 and a support rib 24. The blade 22 is shaped and dimensioned to extend along and cover the discontinuity 8 in the skin 2 and to overlap the outer surface 4 of the skin 2 adjacent to the discontinuity 8. As can best be seen in FIG. 1, the blade 22 has a normally concave cross section. This cross section is flattened into a less concave configuration when the seal 20 is fully installed, as shown in FIG. 2. In its installed use position, the blade 22 is substantially flush with the outer surface 4 of the skin 2. In the preferred embodiment, the blade 22 is formed from spring steel. The blade 22 is preferably very thin with a thickness, for example, of about 0.016 inch.

Figure 3:
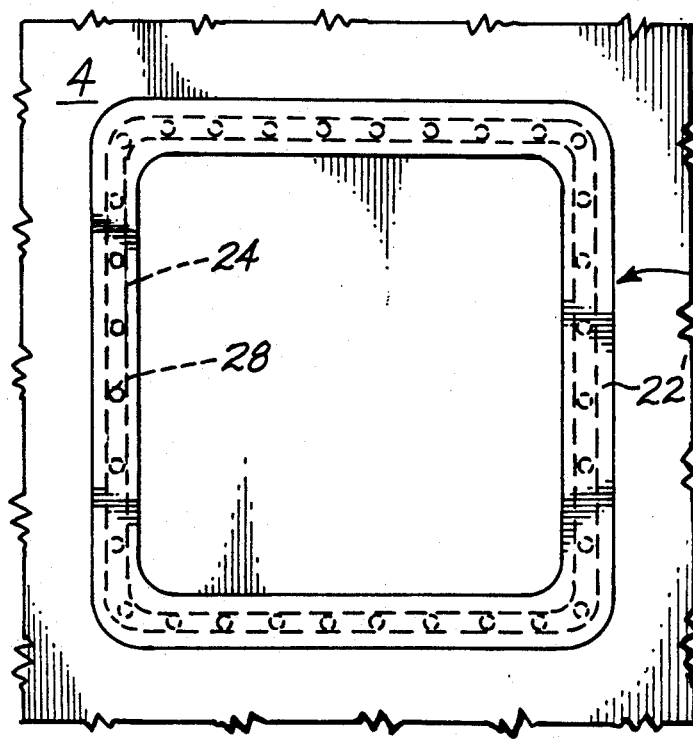
FIG. 3 is a top plan view of an outer skin portion of an aircraft having an access panel therein sealed in accordance with the invention.

The blade 22 may have various plan configurations. For example, it may be in the form of a straight strip for use in covering a substantially linear discontinuity in the skin 2. Another example of a possible plan configuration is shown in FIG. 3. In this configuration, the blade 22' of the seal 20' has a closed substantially square configuration to cover the discontinuity around a removable access panel in the skin 2. A blade 22' having the configuration shown in FIG. 3 preferably has a substantially constant cross section of the type shown in FIG. 1.

The rib 24 of the sealing member 22, 24 extends along the length of the inner surface of the blade 22, as shown in FIG. 1. The rib 24 may be secured to the blade 22 by suitable means, such as welding or diffusion bonding. The rib 24 is preferably positioned along a center portion of the inner surface of the blade 22 essentially equidistant from each of the longitudinal edges of the blade 22. A plurality of fasteners 26, 28 each have a component 28 secured to the rib 24. The fasteners 26, 28 are spaced from each other along the length of the discontinuity 8 and the sealing member 22, 24. As shown in FIG. 2, the rib 24 extends along the discontinuity 8 and abuts the outer surface 4 of the skin 2 adjacent to the discontinuity 8 to support the blade 22 between the fasteners 26, 28. Preferably, the rib 24 abuts an inset portion 5 of the outer surface 4 to allow the blade 22 to lie nearly flush.

The fastener 26, 28 shown in FIGS. 1 and 2 is only one example of a known type of fastener which is suitable for use in the seal 20 of the invention. It is currently the preferred type of fastener for use in the invention. The fastener 26, 28 is substantially the same as a type of fastener sold by the Eaton Corporation of Cleveland, Ohio under the trademark Tinnerman.

The fastener 26, 28 has a first component 26 that is secured to the inner surface 6 of the skin 2 and extends across the discontinuity 8. As shown in FIG. 2, the first component 26 is secured to the skin 2 by means of the mounting member or flange 12. The fastener component 26 has two opposite mounting flanges 32 which receive rivets 34 for attaching it to the flange 12. These flanges 32 are connected by a yoke 36 having a rounded V-shape. Opposite spring fingers 38 are carried by the yoke 36 and define a ball-receiving opening.

The fastener 26, 28 has a second component 28 that is secured to the rib 24 of the sealing member 22, 24. The second component 28 is dimensioned to extend inwardly from the rib 24 into the discontinuity 8 and engage the first component 26. As shown in FIG. 2, the second component 28 extends through the discontinuity 8 and the inner surface 6 of the skin 2. The inner end of the second component 28 forms a ball 30 which is engaged by the spring fingers 38 of the first component 26. The base of the second component 28 opposite the ball 30 may be secured to the rib 24 by various means. For example, a threaded stud may be formed on the end of the second component 28 to threadedly engage a hole in the rib 24, as shown in FIGS. 1 and 2. More preferred methods for attaching the second component 28 are welding and diffusion bonding.

The first component 26 of the fastener 26, 28 and, where necessary, the mounting member 12, may be installed during the initial manufacture of the aircraft or when the aircraft is retrofitted to accept the seal 20 of the invention. The first component 26 is intended to be permanently fastened to the skin 2 either directly or by means of the mounting member 12. The remaining portions of the seal 20 are easily and readily installable and removable. The seal 20 is completely reusable since the two components 26, 28 of the fastener may readily be snapped back together a virtually unlimited number of times after being separated.

When the seal 20 is to be installed or reinstalled in its use position, the operator simply exerts an inward pressure on the blade 22 to urge the ball 30 into engagement with the spring fingers 38 of the fastener 26, 28. The spring fingers 38 spread apart and then close together around the ball 30 to automatically releasably lock the fastener components 26, 28 together. This secures the sealing member 22, 24 in its use position shown in FIG. 2 and urges the edges of the blade 22 into sealing engagement with the outer surface 4 of the skin 2. When it is desired to disengage the seal 20, such as to obtain access through an openable panel, all that is necessary is to insert a thin tool between the outer surface 4 of the skin 2 and the blade 22 and apply a lifting force on the blade 22 to lift it away from the outer surface 4 and thereby disengage the fastener components 26, 28 from each other. The amount of force required to engage and disengage the fastener 26, 28 can be varied by varying the spring strength of the fingers 38. The separating force required in turn is a factor to be considered in determining the spacing of the fasteners 26, 28 from each other. An example of a typical spacing would be about four inches.

As noted above, the blade 22 is preferably formed from spring steel. This blade material has the advantage of providing a strong spring action to provide a tight and reliable seal and of being electrically conductive so that the blade 22, when positioned on a conductive outer skin surface 4, provides a continuous electrical path along the outer surface 4 across the discontinuity 8. The rib 24 may also be made from a conductive material if conductivity to the mounting flange 12 is desirable or at least not undesirable.

As shown in FIG. 2, the mounting flange 12 of the rib 10 is attached to the skin 2 by means of a fastener 14 which extends through the skin 2. In this type of situation, it would generally be desirable to cover and/or seal the outer surface of the fastener 14. Therefore, the blade 22 of the seal 20 is preferably dimensioned to cover the outer end of the fastener 14.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. A removable seal for covering and sealing a discontinuity extending through an outer skin portion of an aircraft, said seal comprising:
   a resilient sealing member having a use position in which it covers said discontinuity and overlaps the outer surface of said outer skin portion; and
   a fastener having a first component secured to an inner surface of said outer skin portion and extending at least partially across said discontinuity, and a second component secured to said sealing member and dimensioned to extend inwardly into said discontinuity and engage said first component; said first and second components having portions that automatically releasably lock said components together, when inward pressure is exerted on said sealing member to urge said first component into engagement with said second component, to secure said sealing member in said use position and urge said sealing member into sealing engagement with said outer surface of said outer skin portion, and that are releasable when a lifting force is exerted on said sealing member to disengage said components from each other.

2. The seal of claim 1, in which said portions of said components are reusable for locking said components together.

3. The seal of claim 1, comprising a mounting member carried by said skin portion for securing said first component to said inner surface.

4. The seal of claim 1, in which said sealing member has a normally concave cross section which is flattened, when said components are locked together, to become substantially flush with said outer surface of said skin portion.

5. The seal of claim 4, which comprises a plurality of said fasteners spaced apart from each other; and in which said sealing member comprises a blade having said normally concave cross section, and a rib to which said second components of said fasteners are secured, said rib being positioned to extend along and adjacent to said discontinuity and to abut said outer surface of said skin portion to support said blade between said fasteners.

6. The seal of claim 1, in which said outer surface of said skin portion is electrically conductive; and said sealing member has electrically conductive portions to provide a continuous electrical path along said outer surface of said skin portion across said discontinuity.

7. The seal of claim 6, in which said sealing member comprises a blade of spring steel that forms said conductive portions.

8. The seal of claim 6, in which said sealing member comprises a blade that forms said conductive portions and has a normally concave cross section which is flattened, when said components are locked together, to become substantially flush with said outer surface of said skin portion.

9. The seal of claim 8, which comprises a plurality of said fasteners spaced apart from each other; and in which said sealing member further comprises a rib to which said second components of said fasteners are secured, said rib being positioned to extend along and adjacent to said discontinuity and to abut said outer surface of said skin portion to support said blade between said fasteners.

10. The seal of claim 1, in which an attaching fastener extends through said skin portion adjacent to said discontinuity, and said sealing member is dimensioned to cover said attaching fastener.

11. The seal of claim 10, in which said sealing member has a normally concave cross section which is flattened, when said components are locked together, to become substantially flush with said outer surface of said skin portion.

12. The seal of claim 11, which comprises a plurality of said fasteners spaced apart from each other; and in which said sealing member comprises a blade having said normally concave cross section, and a rib to which said second components of said fasteners are secured, said rib being positioned to extend along and adjacent to said discontinuity and to abut said outer surface of said skin portion to support said blade between said fasteners.

* * * * *